(12) United States Patent
Guo et al.

(10) Patent No.: US 9,970,484 B2
(45) Date of Patent: May 15, 2018

(54) CURVED TRENCH BALL BEARING

(71) Applicant: NORTHWEST A & F UNIVERSITY, Xianyang (CN)

(72) Inventors: Kangquan Guo, Xianyang (CN); Nuo Shi, Xianyang (CN); Guisheng Guo, Xianyang (CN); Yaohua Hu, Xianyang (CN); Haixia Lu, Xianyang (CN); Xingshu Li, Xianyang (CN); Shasha Yin, Xianyang (CN)

( * ) Notice: Subject to any disclaimer, the term of this patent is extended or adjusted under 35 U.S.C. 154(b) by 219 days.

(21) Appl. No.: 14/994,148

(22) Filed: Jan. 13, 2016

(65) Prior Publication Data

US 2016/0123395 A1 May 5, 2016

Related U.S. Application Data

(63) Continuation of application No. PCT/CN2014/084488, filed on Aug. 15, 2014.

(30) Foreign Application Priority Data

Sep. 11, 2013 (CN) .......................... 2013 1 0412905

(51) Int. Cl.
| | |
|---|---|
| *F16C 33/58* | (2006.01) |
| *F16C 19/50* | (2006.01) |
| *F16C 19/06* | (2006.01) |
| *F16C 19/26* | (2006.01) |

(52) U.S. Cl.
CPC ............ *F16C 33/585* (2013.01); *F16C 19/06* (2013.01); *F16C 19/50* (2013.01); *F16C 33/588* (2013.01); *F16C 19/26* (2013.01)

(58) Field of Classification Search
CPC ........ F16C 19/06; F16C 33/58; F16C 33/583; F16C 33/585
See application file for complete search history.

(56) References Cited

FOREIGN PATENT DOCUMENTS

| | | | | |
|---|---|---|---|---|
| DE | 4300372 A1 | * | 7/1994 | ............... F16H 1/32 |
| JP | 2001271842 A | * | 10/2001 | ............... F16C 33/32 |
| JP | 2008168822 A | * | 7/2008 | |

* cited by examiner

Primary Examiner — Phillip A Johnson
(74) Attorney, Agent, or Firm — Wayne & Ken, LLC; Tony Hom

(57) ABSTRACT

Disclosed is a curved trench ball bearing, which includes an outer ring 1, a set of steel balls 2, a set of retainers 3 and an inner ring 4. The raceways of outer ring 1 and inner ring 4 are used for inlaying steel balls. At least one of them is "S"-shaped curve arc raceway end to end, the other is linear or "S"-shaped curve arc raceway. The number of the "peak" and the number of the "valley" of the curve arc raceway are equal to or an integer times of the number of steel balls. By means of this structure, a bearing can achieve the displacement of reciprocating rectilinear motion while rotating, thereby simplifying a mechanical structure of a kneading roller.

5 Claims, 7 Drawing Sheets

CURVED TRENCH BALL BEARING

CROSS-REFERENCE TO RELATED APPLICATIONS

This application is a continuation of International Patent Application No. PCT/CN2014/084488 with an international filing date of Aug. 15, 2014, designating the United States, now pending, and further claims priority benefits to Chinese Patent Applications No. 201310412905.5, filed Sep. 11, 2013. The contents of all of the aforementioned applications, including any intervening amendments thereto, are incorporated herein by reference.

FIELD

The present disclosure relates to annular ball bearings and, in particular, to curved trench ball bearings belonging to the field of general machine parts.

BACKGROUND

General bearings are used to locate shaft parts, so that it can rotate flexibly. However, the general machine parts with the capable of axial displacement can not be produced. For the mechanisms with the capable of both rotation and axial displacements, such as the motion of rub squeeze rollers, the applications of general bearings will make the mechanism complicated.

In order to simplify mechanical structure of rub squeeze rollers and change rotary motion into reciprocating linear motion, the invention discloses a curved trench ball bearing.

SUMMARY

The technical scheme of the invention is that the linear arc groove of the inner and outer rings in traditional bearing is changed into a curve groove with a complete symmetry, and the number of the "peak" and "valley" of the curve is equal to or an integer multiple of the number of steel balls. In the process of the inner and outer rings rotation, the shaft is rotated and done the periodic reciprocating linear movement. The main contents are as follows;

The curved trench ball bearing includes an outer ring 1, a set of steel balls 2, a set of retainers 3 and an inner ring 4. The raceways of outer ring 1 and inner ring 4 are used for inlaying steel balls. At least one of them is "S"-shaped curve arc raceway end to end, the other is linear or "S"-shaped curve arc raceway. The number of the "peak" and the number of the "valley" of the curve arc raceway are equal to or an integer times of the number of steel balls 2.

A set of steel balls 2 is installed betty en the outer ring 1 and the inner ring 4 and fixed by a set of retainers 3. The step of "S"-shaped curve arc raceway in the outer ring 1 (the distance between two adjacent "peak" or "valley") is equal to or integer times of spacing between the outer edges of steel ball 2 (the distance between two adjacent steel balls). Or the step of "S"-shaped curve arc raceway in the inner ring 4 is equal to or integer times of spacing between the outer edges of steel ball 2.

A set of steel balls 2 is installed between the outer ring 1 and the inner ring 4 and fixed by a set of retainers 3. The step of "S"-shaped curve arc raceway in outer ring 1 is equal to or integer times of spacing between the outer edges of steel ball 2. Or the step of "S"-shaped curve arc raceway in the inner ring 4 is equal to or integer times of spacing between the inner edges of steel ball 2.

There are three structures for the retainers 3. One is the rigid connection between the retainers 3 and the inner ring 4. One is rigid connection between retainers 3 and outer ring 1. Another is to keep free state neither the first nor the second structure.

The adjacent steps of "S"-shaped curve arc raceway are perfectly symmetrical curve or straight line.

The invented annular ball bearing has the following advantages (1) The rotary motion can be changed into linear motion;
(2) The mechanical structures of rubbing roller can be simplified;
(3) It is simple structure and small volume.

The meanings of each mark in the figures are as follows:
1 is an outer ring, 2 are a set of steel balls, 3 are a set of retainers, 4 is an inner ring, R is radius of arc raceway, D is outside diameter of bearing, d is inside diameter of bearing, B is the width of bearing broadside, and b is the width of bearing narrowside.

DETAILED DESCRIPTION OF THE PREFERRED EMBODIMENTS

Now the preferred embodiments combined with the above drawings are given.

Example 1

Figure 1:
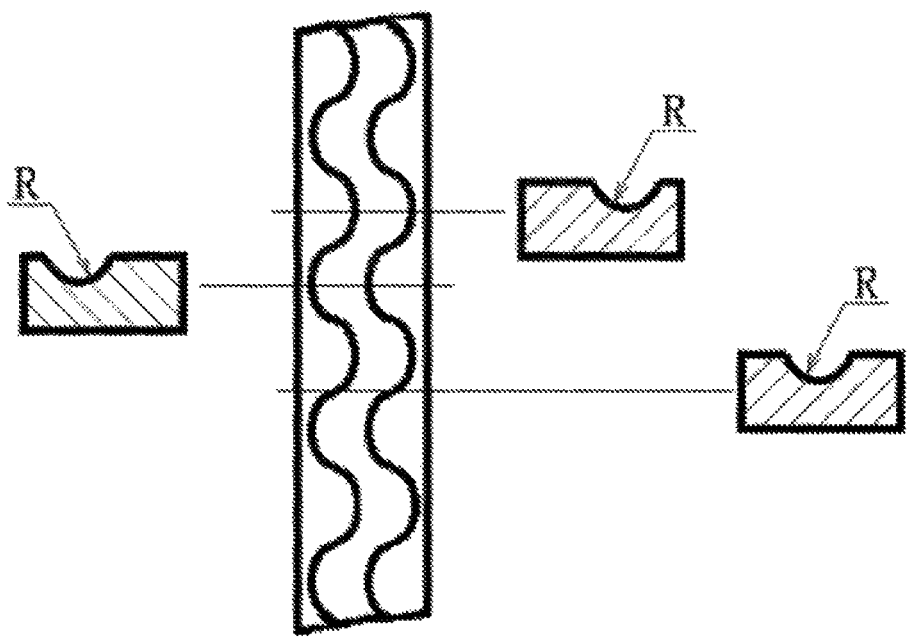
FIG. 1 the unfolded drawing of outer ring of curve arc raceway.
Figure 2:
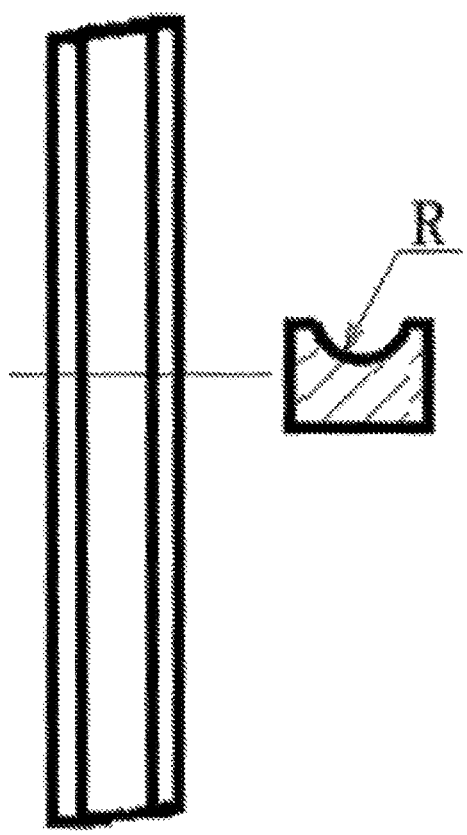
FIG. 2 is the unfolded drawing g of inner ring of linear arc raceway.

The outer ring 1 is made into "S"-shaped curve arc raceway as shown in FIG. 1. The inner ring 4 is made into linear arc raceway as shown in FIG. 2. The retainers 3 and the inner ring 4 are fixed and rotated together, and the number of the "peak" and "valley" of the curve is equal to the number of steel balls.

Figure 3:
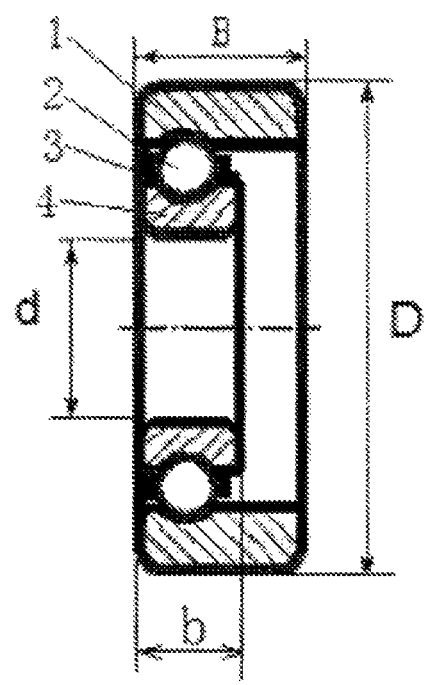
FIG. 3 is structure drawing of curved trench ball bearings while inner ring moves to left (that is the steel balls are in the peak).
Figure 4:
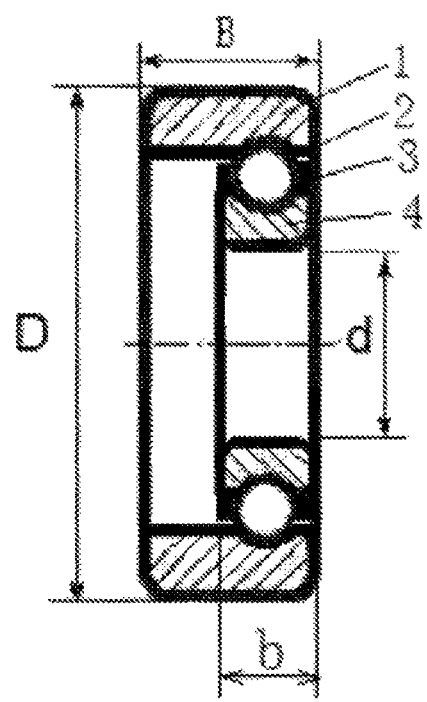
FIG. 4 is structure drawing of curved trench ball bearings while inn ring moves to right (that is the steel balls are in the valley).
Figure 5:
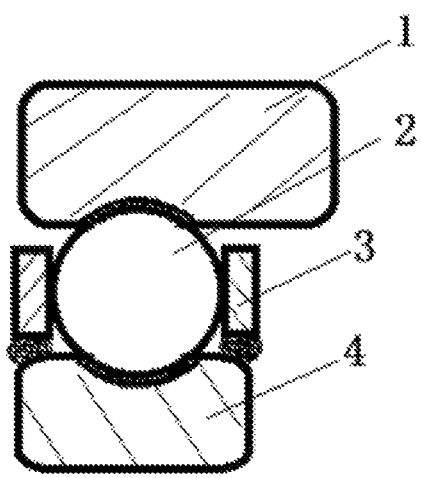
FIG. 5 shows a first structure of the retainer in which the retainer is in rigid connection with the inner ring and the trench is provided in the outer ring.
Figure 6:
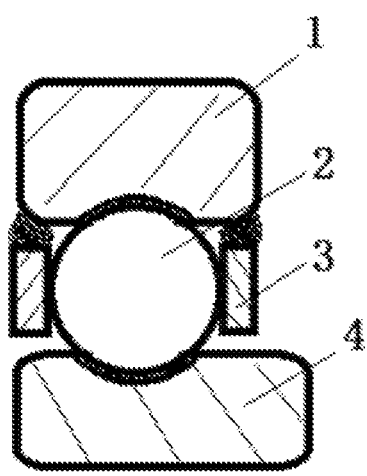
FIG. 6 shows a second structure of the retainer in which the retainer is in rigid connection with the outer ring and the trench is provided in the inner ring.
Figure 7:
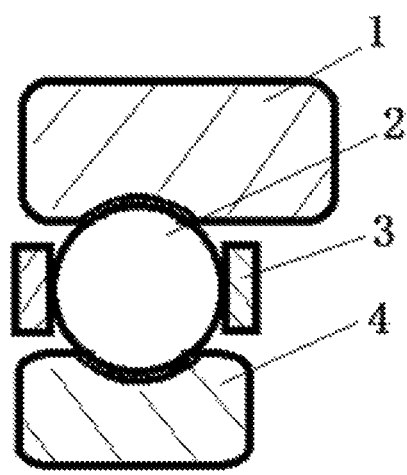
FIG. 7 shows a third structure of the retainer in which the retainer is not in rigid connection with either the inner ring or the outer ring and the trench is provided in the inner ring.

Active oscillating curved trench ball bearings are produced as the above methods. The curved trench ball hearings whose inner ring 4 is linear raceway can also keep retainers 3 free. Such structures of the curved trench ball bearings are passive swinging either left or right as shown in FIG. 3 and FIG. 4. The active and passive swinging curved trench ball bearings are installed in pairs, which can reduce the accuracy of the installation position.

Example 2

The inner ring 4 is made into curve arc raceway. The outer ring 1 is made into linear arc raceway. The retainers 3 and the outer ring 1 are fixed and rotated together, and the number of the "peak" and "valley" of the curve is equal to the number of steel balls. The curved trench ball bearings are produced as the above methods. In the process of the curved trench ball bearings rotation, the inner ring 4 is rotated and done the periodic reciprocating linear movement.

Example 3

The arc raceways of both the outer ring 1 and the inner ring 4 are made into curve structures. The arc raceways of both the outer ring 1 and the inner ring 4 are made into curve structures and keep the retainers 3 free, which can increase the swinging range and reduce the accuracy of the installation position when installed in pairs.

Other preferred embodiments can be from the same principles and structural changes.

INDUSTRIAL APPLICABILITY

The invented curved trench ball bearings can be used for the mechanism rotating at the same time the shaft swings, such as swinging mechanism, rub squeeze mechanism, These mechanisms are, often used in agricultural equipment such as peeling, hulling etc.

We claim:

1. A curved trench ball bearing includes an outer ring, a set of steel balls, a retainer and an inner ring, raceways of the outer ring and inner ring are used for inlaying the steel balls, one of the raceways is at least an "S"-shaped curve arc raceway end to end, the other of the raceways is a linear or "S"-shaped curve are raceway, the number of the peaks and the number of the valleys of the "S"-shaped curve arc raceway are equal to a positive integer times of the number of the steel balls.

2. The curved trench ball bearing of claim 1, wherein the set of steel balls is installed between the outer ring and the inner ring and fixed thereafter by the retainer, a step of "S"-shaped curve arc raceway in the outer ring, which is the distance between two adjacent peaks or valleys, is equal to a positive integer times of the spacing between the outer edges of the steel balls.

3. The curved trench ball bearing of claim 1, wherein the set of steel balls is installed between the outer ring and the inner ring and fixed thereafter by the retainer, a step of "S"-shaped curve arc raceway in the inner ring is equal to a positive integer times of the spacing between the inner edges of the steel balls.

4. The curved trench ball bearing of claim 1, wherein the retainer includes one of three structures, the first structure is a rigid connection between the retainer and the inner ring, the second structure is a rigid connection between the retainers and the outer ring, and the third structure is a structure in which the retainer is not in rigid connection with either the inner ring or the outer ring.

5. The curved trench ball bearing of claim 1, wherein adjacent peaks and valleys of the "S"-shaped curve are raceway are symmetrical curves or straight lines.

* * * * *